(12) United States Patent
Otani et al.

(10) Patent No.: US 7,175,325 B2
(45) Date of Patent: Feb. 13, 2007

(54) VEHICULAR LAMP HAVING A REMOVABLE LENS WITH AN EXTENSION REFLECTOR

(75) Inventors: Haruo Otani, Shizuoka (JP); Fujihiko Sugiyama, Shizuoka (JP); Kazuhiro Yamazaki, Shizuoka (JP); Michihiko Suzuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 93 days.

(21) Appl. No.: 10/900,884

(22) Filed: Jul. 28, 2004

(65) Prior Publication Data

US 2005/0024888 A1 Feb. 3, 2005

(30) Foreign Application Priority Data

Jul. 29, 2003 (JP) ............................. 2003-281572

(51) Int. Cl.
*F21V 7/04* (2006.01)
(52) U.S. Cl. .................. 362/549; 362/519; 362/546
(58) Field of Classification Search ................ 362/261, 362/516, 549, 546
See application file for complete search history.

(56) References Cited

U.S. PATENT DOCUMENTS

| | | | | |
|---|---|---|---|---|
| 5,327,330 A | * | 7/1994 | Van Oel et al. | 362/547 |
| 5,915,831 A | * | 6/1999 | Bonin et al. | 362/519 |
| 6,464,374 B2 | | 10/2002 | Akiyama et al. | 362/267 |
| 6,478,451 B2 | | 11/2002 | Akiyama et al. | 362/267 |
| 6,523,983 B2 | * | 2/2003 | Young, Jr. | 362/546 |
| 6,592,239 B1 | | 7/2003 | Akiyama et al. | 362/267 |
| 6,698,912 B2 | * | 3/2004 | Yang | 362/516 |
| 7,040,793 B2 | * | 5/2006 | Chase | 362/549 |

FOREIGN PATENT DOCUMENTS

JP 6-50887 12/1994

\* cited by examiner

*Primary Examiner*—Sandra O'Shea
*Assistant Examiner*—Anabel Ton
(74) *Attorney, Agent, or Firm*—Osha Liang L.L.P.

(57) ABSTRACT

A vehicular headlamp includes a lamp body having an opening, a first reflector disposed within the lamp body, a lens, and a second reflector. The second reflector serves as an extension reflector to cover a gap between the opening of the lamp body and the first reflector. The lens and the second reflector are joined together at an edge portion thereof by laser welding. The second reflector has a leg portion on a back surface thereof. An edge portion of the opening has a groove to receive the leg portion, and seal material having a predetermined adhesibility, which can be pulled off, is injected into the groove. The second reflector joined to the lens is mounted on an edge of the opening of the lamp body via the seal material.

8 Claims, 6 Drawing Sheets

VEHICULAR LAMP HAVING A REMOVABLE LENS WITH AN EXTENSION REFLECTOR

BACKGROUND OF INVENTION

1. Field of the Invention

The present invention relates to a vehicular lamp provided with an extension reflector in a lamp body thereof, which is configured such that a lens can be removed from the lamp body without degrading the aesthetic appearance of the vehicular lamp.

2. Background Art

A vehicular lamp, such as a headlamp for a vehicle, is typically configured to dispose a bulb and a reflector as a light source within a lamp chamber, which is formed by mounting a lens on a front opening portion of a lamp body. For the configuration that the lens is mounted on the front opening portion of the lamp body, a technique that the lens is integrated with the lamp body in a manner of laser welding may be used. Alternatively, a bonding technique using seal material, such as a bonding agent, hot melt adhesive, or the like may be used. With such techniques, however, it is not possible to remove the lens from the lamp body. Thus, when the lens is damaged, it is not possible to replace only the lens, and accordingly replacing the entire lamp is required. In particular, replacing a lamp, such as a headlamp, provided with a reflector and an aiming mechanism as a whole creates rising costs. Further, it is not easy to demount the lens from the lamp body, and, as a result, this is obstacle to recycling components or parts.

Meanwhile, the following configuration is proposed in this art. That is, it is configured to ensure sealing performance by inserting packing in between the lens and the lamp body, attaching the lens to the lamp body in a manner of using an engaging mechanism. This may be favorable in view of lens replacement and recycling. However, in such a configuration, the engaging mechanism is disposed around an edge of the lens, as is corresponding to an edge of the front opening of the lamp body. Accordingly, a region of the edge appears dark or black due to the engaging mechanism. Further, such a dark region appears to expand outward, and thereby the configuration degrades the aesthetic appearance of the lamp when seen from the front. The problem regarding appearance also occurs in the conventional lamp using the seal material.

Patent Document 1 listed below proposes a technique that an adapter is bonded to an edge of a lens and then attached to the lamp body via packing. With the technique disclosed in Patent Document 1, the appearance of the lamp in a front view may be improved by reducing the area bound the lens and the adapter. Further, the adapter may be easily removed from the lamp body at the bounded area in which the packing is used. Accordingly, this may provide benefits in lens replacement and recycling.

[Patent Document 1] Japanese Examined Utility Model Publication 6-50887.

With the technique of Patent Document 1, in order to bond the adapter to the lens, it is necessary to form the seal groove on the bonded area, and thereby the seal groove still appears dark in the front view. In addition, it is difficult to reduce this dark region, the technique has limits with respect to the improvement of the appearance in the front view. Moreover, the adapter is provided separately from the lamp body. Thus, the conventional lamp, which is provided with an extension reflector for avoiding exposing a gap between an inner surface of the lamp body and a reflector to sight through the lens, requires the adaptor, as is an independent part, in addition to essential parts of the lamp. Accordingly, the number of parts of the lamp increases, and thereby becomes an obstacle to cost reduction. Further, another gap is created between the extension reflector and the adapter, and, accordingly, the dark region appears to further extend.

SUMMARY OF INVENTION

An object of the present invention is to provide a lamp having a removable lens with an extension reflector, avoiding increasing the number of parts and degrading the aesthetic appearance of the lamp.

In accordance with one aspect of the present invention, a vehicular lamp comprises a lamp body, a lens, a reflector, and an extension reflector. The lens is welded to the extension reflector, and the extension reflector is attached to the lamp body by using seal material possessing adhesibility that can be pulled off.

According to the present invention, because the lens is welded to the extension reflector, and the extension reflector is attached to the lamp body using the seal material, it is possible to reduce the welding area of an external periphery of the lens, whereby the aesthetic appearance is improved without increasing the number of parts. Further, it is also possible to easily remove the lens, along with the extension reflector, from the lamp body. Accordingly, this makes lens replacement and recycling easy.

Other aspects and advantages of the invention will be apparent from the following description and the appended claims.

BRIEF DESCRIPTION OF DRAWINGS

FIGS. 4(*a*) and 4(*b*) are an partially enlarged cross-sectional view of the lamp of an embodiment.

FIGS. 5(*a*) and 5(*b*) are an partially enlarged cross-sectional view of the lamp of another embodiment.

DETAILED DESCRIPTION

In accordance with the preferred embodiment of the present invention, seal material is installed in the rear of an extension reflector such that the aesthetic appearance of the lamp is not degraded by the seal material. For example, the extension reflector includes an outer frame portion that extends beyond an external side of a front opening of the lamp body; the lens is welded to the extension reflector on an edge of the outer frame portion; and the seal material is installed in the rear of the outer frame portion. Thus, it is possible to keep or improve the aesthetic appearance of the lamp.

Figure 1:
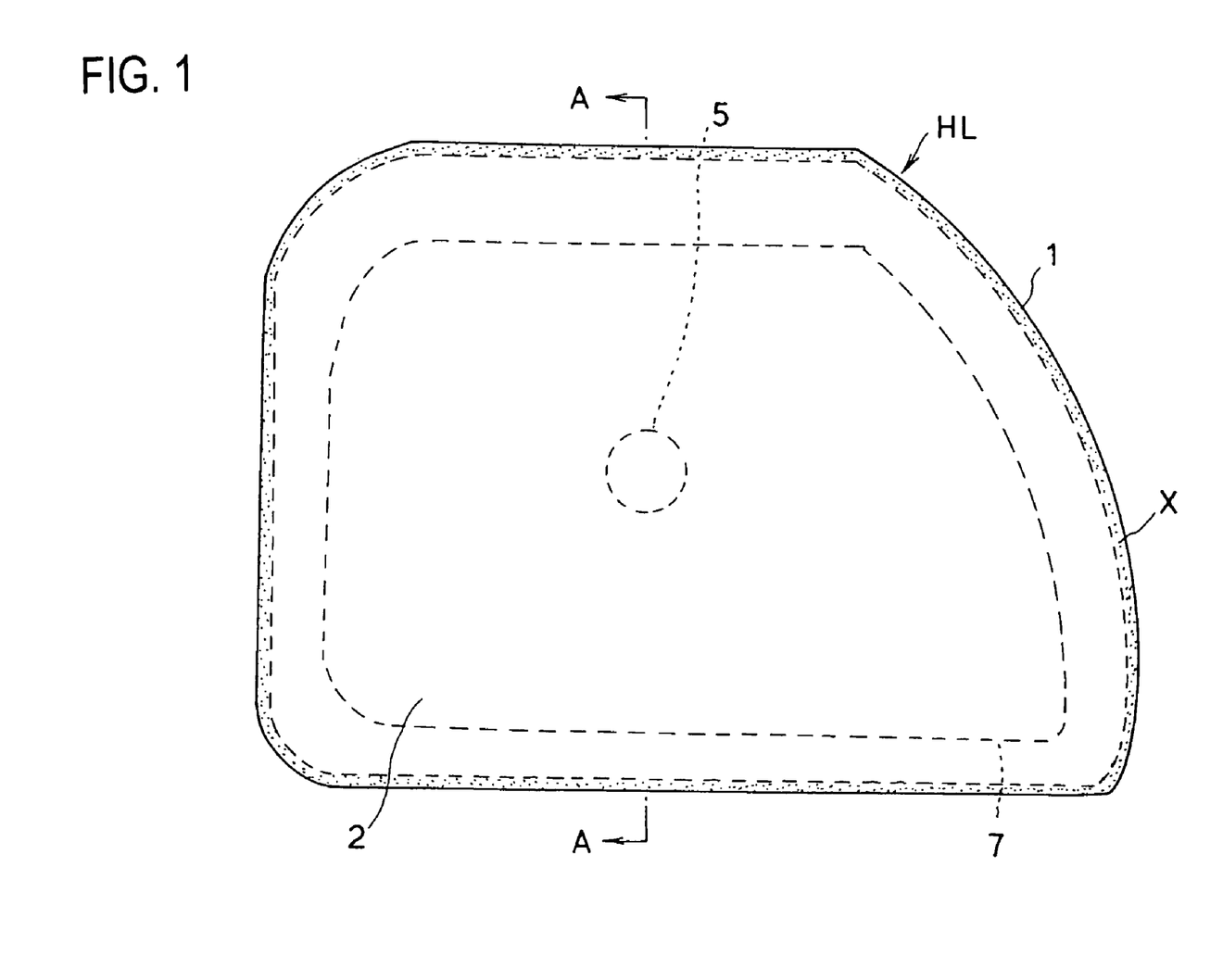
FIG. 1 is a front view of a lamp according to an embodiment of the present invention.
Figure 2:
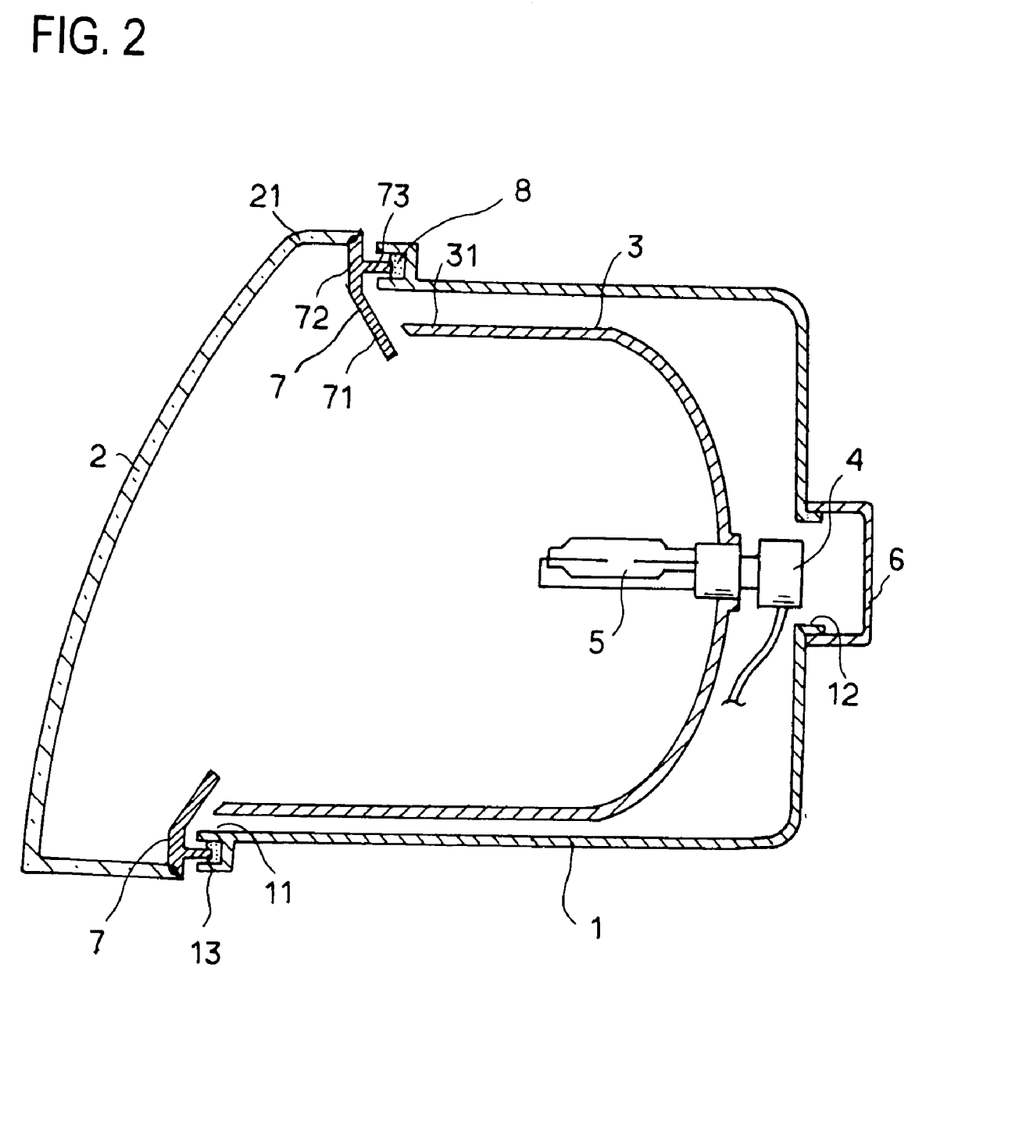
FIG. 2 is a cross-sectional view along a line AA of FIG. 1.
Figure 3:
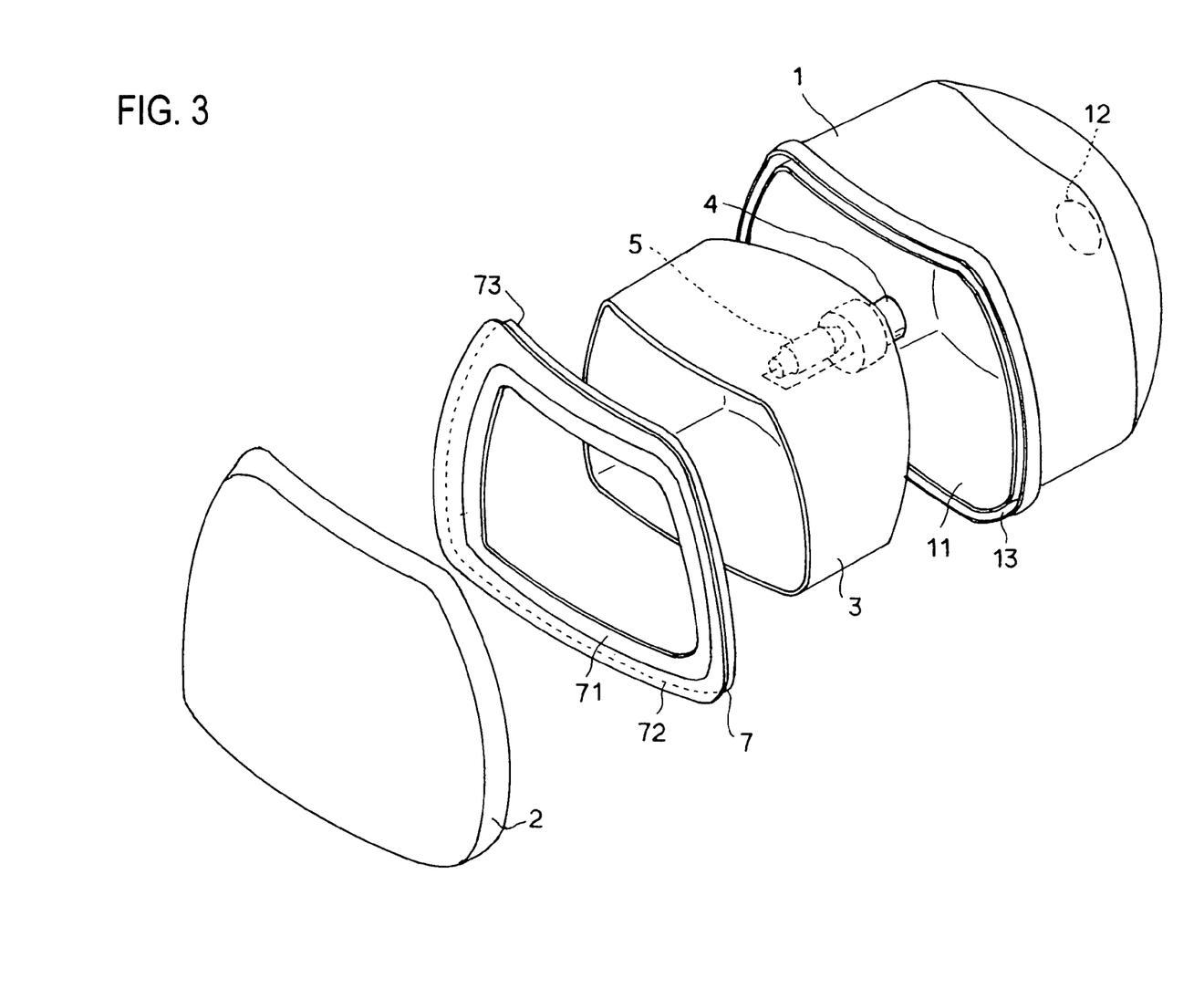
FIG. 3 is an exploded perspective view of the lamp of an embodiment.

The preferred embodiment of the present invention will be described with reference to the drawings. FIG. 1 is a front view of an embodiment that the present invention is applied to a lamp provided with an extension reflector, and in particular to a headlamp HL for a vehicle. FIG. 2 is a cross-sectional view along line AA of FIG. 1. FIG. 3 is an exploded perspective view of the members of the lamp.

Referring to FIG. 1 to 3, a lamp body 1 is formed in a housing-like shape using PP (polypropylene), or the like, and has a bulb insertion opening 12 in a rear surface thereof. Further, a lens 2 is attached to a front opening portion 11, and a seal groove 13 that opens in a direction of the front is formed on a periphery or edge portion of the front opening portion 11. A reflector 3 is disposed within the lamp body 1, and a discharge bulb 5 is attached to the reflector 3. Further, an attachment end portion of the discharge bulb 5 is connected to a connector 4 to supply power. The reflector 3 is supported such that it can be tilted within the lamp body by an aiming mechanism, as is not shown, in an up-down direction and a left-right direction. An explanation of the aiming mechanism will be omitted herein. The connector 4 can be fitted to or removed from the reflector 3 via the bulb insertion hole 12. A cover 6 made of resin hermetically seals between the lamp body 1 and the bulb insertion hole 12.

Figure 4A:
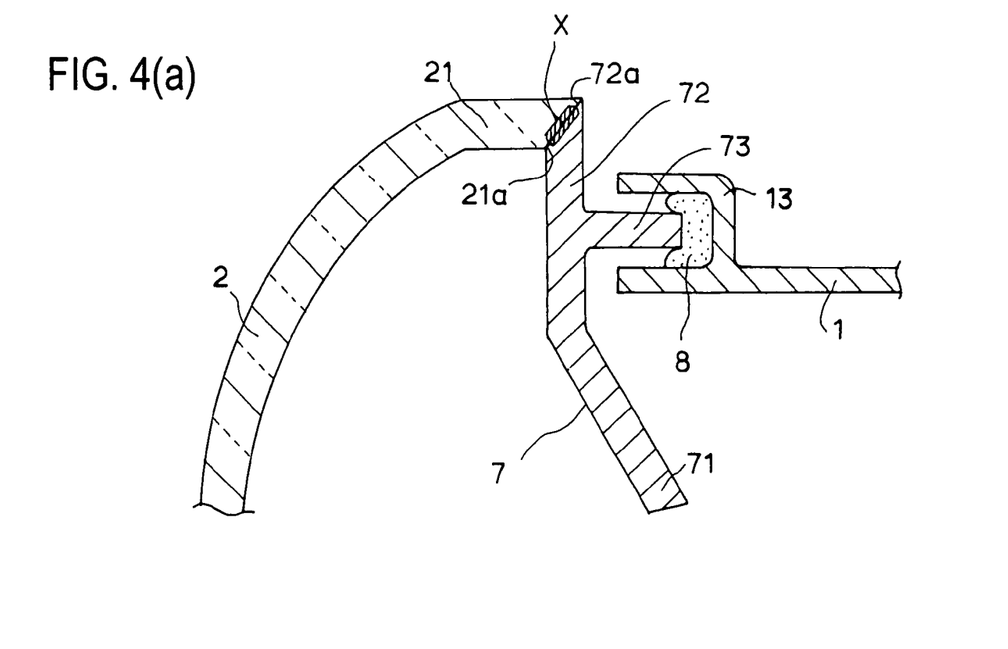

An extension reflector 7 for covering a gap between a front edge portion 31 of the reflector 3 and the front opening portion 11 of the lamp body 1 is disposed within the lamp body 1 and made from an alloy that uses a sort of recycled material, such as PC (Polycarbonate) and PBT (Poly-butylene terephthalate)/PET (Poly-ethylene terephthalate). As shown in FIG. 4(A), which shows an enlarged cross-sectional view of the main members or components of the lamp, the extension reflector 7 is integrally configured by an inner frame portion 71 and an outer frame portion 72. The inner frame portion 71 is configured to extend from a proximity of the edge of the front opening portion 11 to an inner area beyond the front edge portion 31 of the reflector 3, while the outer frame portion 72 is configured to extend from the outer edge of the inner frame portion 71 to an area beyond the front opening portion 11 of the lamp body 1. A leg portion or wall 73 is configured to project backward from the back surface of the external end portion 72, corresponding to the seal groove 13 provided on the front opening portion 11 of the lamp body 1. Further, an edge of the outer frame portion 72 is configured to correspond to the contour of the lens 2. An end of the outer frame portion 72 has a surface 72a formed in a tapered shape that is inclined with respect to an optical axis in a cross section. The tapered surface 72a is joined to a tapered surface 21a formed at the edge portion 21 of the lens 2, which is inclined with respect to the optical axis so as to correspond to the tapered surface 72a, by weldings.

In this embodiment, in order to join the lens 2 and the extension reflector 7 together, laser welding method is adopted. The laser welding method comprises holding the lens 2 and the extension reflector 7 in contact, and then irradiating the contact area with a laser beam in a manner of transmitting it through the lens 2 from the outside thereof. Thus, the transmitted laser beam is absorbed into the extension reflector 7, and thereby the abutting contact area of the extension reflector 7 generates heat. This heat is conducted to the lens 2, and the contact area between the extension reflector 7 and the lens 2 is fused. Thus, the lens 2 and the extension reflector 7 are integrally welded. According to this welding method, an contact area necessary for obtaining welding strength, i.e., a welding area, may be required on the lens. In this embodiment, just a welding area as much as the thickness of the lens is reserved. Accordingly, as compared to the conventional configurations that bonding agent is used, it is possible to decrease in a dimensions of the periphery region of the lens, which expands outward. As shown by the stipple-patterned area of FIG. 1, a welding area X at the edge of the lens 2, i.e., a surface area of a darkened portion when the headlamp HL is seen from the front, which is caused by attaching the lens 2 to the lamp body 1, becomes small. Accordingly, it is possible to improve the aesthetic appearance of the headlamp.

Figure 4B:
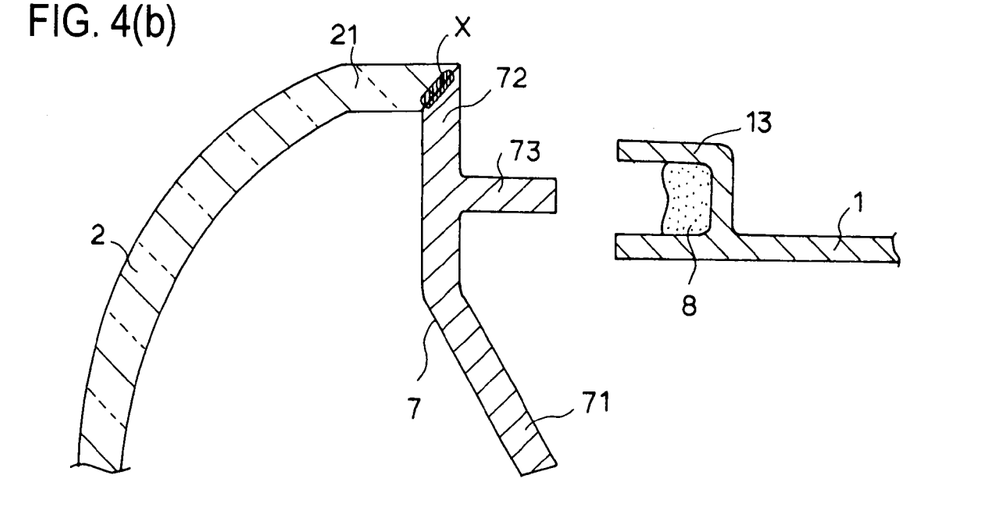

The leg portion 73 provided on the extension reflector 7 is inserted into the seal groove 13 of the lamp body 1 and then attached to the lamp body 1 by hot melt gel 8. Thus, the leg portion 73 adheres to the seal groove 13 via the hot melt gel 8, and the extension reflector 7 and the lamp body 1 are integrally joined. At the same time, it is possible to ensure seal performance between the leg portion 73 and the seal groove 13. Even after cooling, the hot melt gel 8 does not harden completely, and maintains low elasticity and low adhesiveness. Accordingly, when a measure of force in a direction of pulling the lamp body 1 away from the lens 2 is applied, as shown in FIG. 4B, it is possible to separate the lens 2 and the extension reflector 7 integrated therewith from the lamp body 1 by pulling the leg portion 73 out of its integrated state with the hot melt gel 8. Further, the leg portion 73 and the seal groove 13 are behind the outer frame portion 72 of the extension reflector 7, and thus concealed by the outer frame portion 72. Accordingly, the appearance of the headlamp HL is not degraded.

Thus, in the case that the lens 2 is damaged, it is possible to remove the lens 2 and the extension reflector 7 that is integrated therewith from the lamp body 1, and thereby it is possible to easily replace the lens to another one. For example, the lens 2 can be replaced with a so called "dealer lens" that is kept on hand by a dealer, enabling a reduction in cost. Further, because it is possible to easily remove the lens 2 from the lamp body 1, it is easy to disassemble and dismantle the headlamp HL. This allows the headlamp HL to be efficiently recycled.

In addition, the headlamp HL has the configuration that the lens 2 is mounted on the lamp body 1, using the extension reflector 7, which is essentially necessary for the headlamp HL. Accordingly, there is no need to independently provide a component or part like the adapter of Patent Document 1. Thus, this prevents increase in number of parts, and accordingly benefits in cost reduction are realized.

Figure 5A:
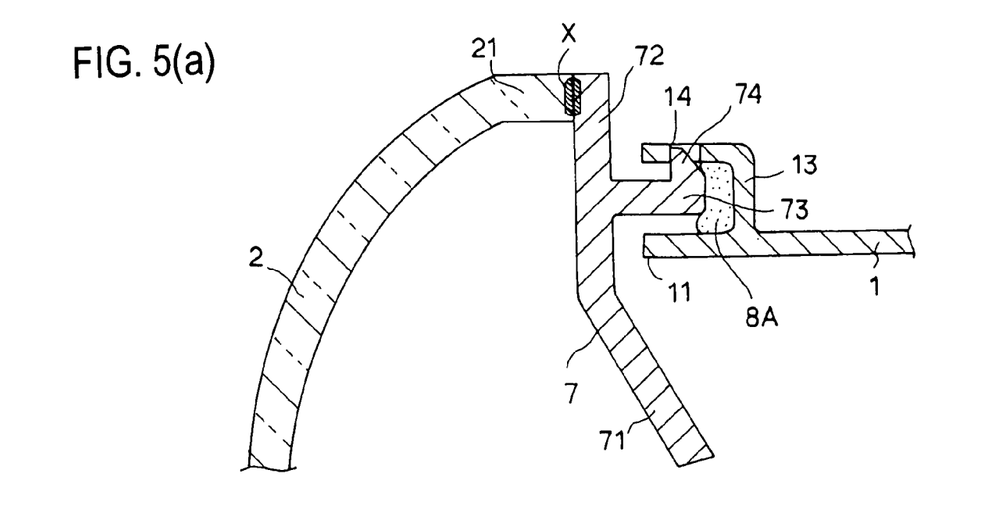
Figure 5B:
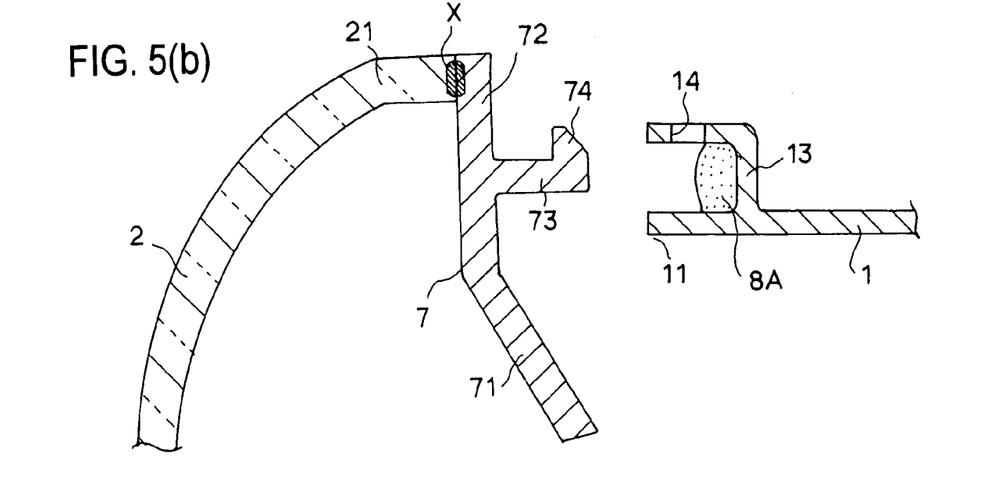

FIGS. 5A and 5B are a partially enlarged cross-sectional view of the lamp according to another embodiment of the present invention, and illustrates modification of a portion of the aforementioned embodiment of FIGS. 4A and 4B. The same as, or equivalent to, a component described in the aforementioned embodiment is denoted with the same reference numeral, and an explanation thereof will be omitted here. A configuration in this embodiment is the same as, or the similar to, that of the aforementioned embodiment in that: the seal groove 13 is formed on the front opening 11 of the lamp body 1; and the extension reflector 7 is joined to the lens 2 with the welding X. However, in this embodiment, neither tapered surfaces are provided on the outer frame portion 72 of the extension reflector 7 nor the edge portion 21 of the lens 2. Further, both are joined together with welding X in the surfaces perpendicular to the optical axis. In addition, a plurality of engagement holes 14 that is pierced in a thickness direction are provided at positions in a circumferential direction on an external periphery wall of the seal groove 13 provided in the lamp body 1. Further, hooks (protrusions or locking portion) 74 at positions corresponding to the engagement holes 14 are integrally configured on the leg portion 73 provided on the back surface of the outer frame portion 72 of the extension reflector 7.

Moreover, the seal groove 13 is filled or inject with a sponge-shaped foam gasket or sealant 8A, which is made from a urethane material or a silicon material, and thereafter the leg portion 73 is inserted into the seal groove 13 such that the hooks 74 of the leg portion 73 are engaged with the engagement holes 14 respectively. As the foam gasket 8A does not have adhesion, the extension reflector 7 is locked in the lamp body 1 by engagement between the hooks 74 and the engagement holes 14. At the same time, the foam gasket 8A is tightly connected to both the leg portion 73 and the seal groove 13 due to the low elasticity thereof, and thereby seal performance is maintained.

According to this embodiment, as shown in FIG. 5(*b*), in making lens replacement, the lens 2 together with the extension reflector 7 can be easily removed from the lamp body 1 in a manner of pulling out the leg portion 73 from the seal groove 13 after releasing the hooks 74 from the engagement holes 14 because the foam gasket 8A does not have adhesion. As a result, replacement of the lens 2 is made possible. Thus, cost reduction can be promoted without any increase in number of parts, and recycling is effectively facilitated. Additionally, as with the aforementioned embodiment, the lens 2 is welded to the extension reflector 7. Thus, just an contact area necessary for welding strength, i.e., a welding area, may be required on the lens. Further, a surface area of a darkened portion when the headlamp HL is seen from the front, which is caused by attaching the lens 2 to the lamp body 1, becomes small. Accordingly, it is possible to improve the aesthetic appearance of the headlamp.

Figure 6:
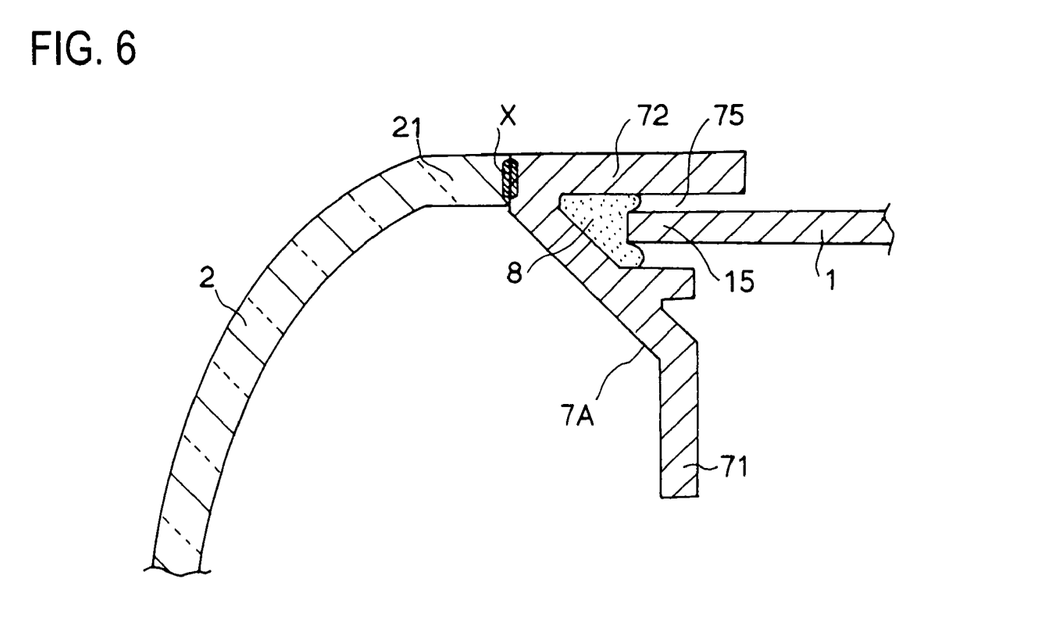
FIG. 6 is an partially enlarged cross-sectional view of the lamp of another embodiment.

FIG. 6 is a cross-sectional view of the lamp according to another embodiment of the present invention. The same as, or equivalent to, that of the aforementioned embodiments is denoted with the same reference numeral, and thus an explanation thereof will be omitted here. In this embodiment, a configuration is the same as, or the similar to, that of the aforementioned embodiment in that an extension reflector 7A is welded to the lens 2. However, the outer frame portion 72 of the extension reflector 7A is formed in a triangular shape in a cross section. An apex of an edge of the extension reflector 7A is attached to the edge portion 21 of the lens 2 with welding X. Further, a seal groove 75, which is formed in a triangular shape in a cross section, is formed along the front opening portion 11 of the lamp body 1 on the back surface of the outer frame portion 72. Moreover, in accordance therewith, the edge portion of the front opening portion 11 of the lamp body 1 serves as a leg portion 15.

Further, the leg portion 15 of the lamp body 1 is inserted into the seal groove 75 at the back surface of the extension reflector 7A, and then attached thereto by the hot melt gel 8. The leg portion 15 adheres to the seal groove 75 via the hot melt gel, and thereby the extension reflector 7A and the lamp body 1 are integrally joined. Further, the seal performance between the leg portion 15 and the seal groove 75 is maintained. In the meantime, by applying a certain degree of force, it is possible to pull the leg portion 15 away from the hot melt 8. Thus, in the case that the lens 2 is damaged, it is possible to remove the lens 2 and the extension reflector 7 integrated therewith from the lamp body 1. Thus, lens replacement can be made easily and costs can be reduced. Further, it is possible to easily remove the lens 2 from the lamp body 1. Advantageously, this allows the headlamp HL to be efficiently recycled.

In this embodiment, the lens 2 is welded to the extension reflector 7A. Accordingly, just a welding are necessary for welding strength may be required on the lens. Thus, as compared to the conventional configurations in which a bonding agent is used, it is possible to decrease in a dimension of the darkened area around the edge of the lens 2. Thus, it is possible to improve the aesthetic appearance of the headlamp HL when seen from the front. Moreover, in this embodiment, there is no need for providing a seal groove at the front edge portion of the front opening 11 of the lamp body 1. Thus, the lamp body can be easily obtained using resin molding, and also downsizing of the lamp body 1 is advantageously facilitated.

Figure 7:
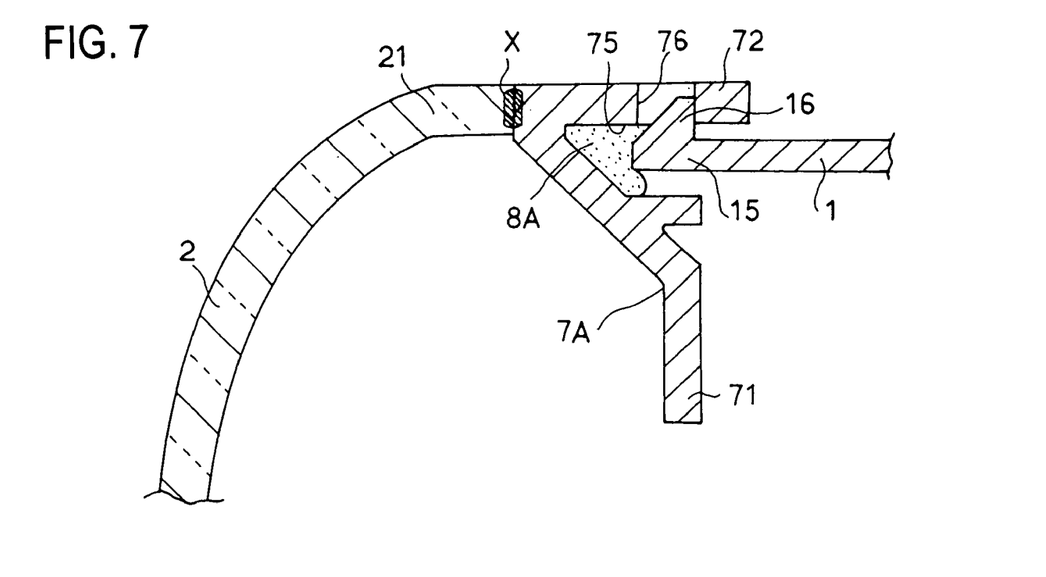
FIG. 7 is an partially enlarged cross-sectional view of the lamp of another embodiment.

FIG. 7 is a cross-sectional view of the lamp according to another embodiment of the present invention, and illustrates modification of a portion of the aforementioned embodiment. The same as, or equivalent to, that of the third embodiment is denoted with the same reference numeral, and an explanation thereof will be omitted here.

The outer frame portion 72 of the extension reflector 7A is formed in the triangular shape in cross section, and the apex of an edge of the extension reflector 7A is attached to the external edge portion 21 of the lens 2 with welding X. Further, the seal groove 75 is configured in the back surface of the outer frame portion 72. A plurality of engagement holes 76 that are pierced in a thickness direction are provided at positions in a circumferential direction on an external periphery wall of the seal groove 75, i.e., an external periphery wall of the outer frame portion 72 of the extension reflector 7A. Moreover, in accordance therewith, the edge portion of the front opening 11 of the lamp body 1 serves as the leg portion 15. The leg portion 15 has hooks (protrusions) 16 at positions corresponding to the engagement holes 76 respectively. Furthermore, in a similar manner to the aforementioned embodiment, the seal groove 75 is filled or injected with the foam gasket 8A. The leg portion 15 is inserted into the seal groove 75, and the hooks 16 are engaged with the engagement holes 76 respecively. Accordingly, the extension reflector 7A is locked in the lamp body 1 by engagement between the hooks 16 and the engagement holes 76. At the same time, the form gasket 8A is tightly connected to both the leg portion 15 and the seal groove 75 due to the low elasticity thereof, and thereby seal performance is maintained.

According to this embodiment, as with the second embodiment, for lens replacement, the lens 2 together with the extension reflector 7 can be easily removed from the lamp body 1 in a manner of pulling out the leg portion 15 from the seal groove 75 after releasing the hooks 74 from the engagement holes because the foam gasket 8A does not have adhesion. By way of this, lens replacement is made possible. Further, cost reduction can be promoted without any increase in number of parts, and recycling is effectively facilitated. Furthermore, the lens 2 is welded to the extension reflector 7A. Thus, just an contact area necessary for welding strength may by required on the lens. Thus, it is possible to improve the appearance of the headlamp HL when the lamp is viewed from the front. In this case, tips of the hooks 16 are configured not to protrude beyond the external periphery wall of the extension reflector 7A. This can avoid degrading the appearance of the headlamp HL based on exposure of the hooks 16 from the front of the headlamp HL. Moreover, in this embodiment, there is no need for providing a seal groove at the front edge portion of the front opening portion 11 of the lamp body 1. Thus, the lamp body can be easily obtained in a manner of resin molding and also downsizing of the lamp body 1 is advantageously facilitated.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicular lamp comprising:
    a lamp body having an opening;
    a first reflector disposed within the lamp body;
    a second reflector hermetically mounted on an edge portion of the opening of the lamp body via seal material, wherein the seal material possesses predetermined adhesibility; and
    a lens joined to the second reflector by welding,
    wherein a front portion of the lamp body has a groove configured to receive a leg portion of the second reflector, and the groove is configured to be injected with the seal material, and
    wherein the leg portion is configured on a back surface of the second reflector when viewed from the optical axis of the vehicular headlamp.

2. The vehicular lamp according to claim 1, wherein the second reflector comprises an outer frame portion that extends beyond the opening of the lamp body.

3. The vehicular lamp according to claim 1, wherein an outer edge of the second reflector is configured with a slope, and an edge of the lens is configured with a slope to correspond to the slope at the outer edge of the second reflector.

4. The vehicular lamp according to claim 1, wherein the second reflector has a groove configured to receive the edge portion of the opening of the lamp body, and the groove is injected with the seal material.

5. A vehicular lamp comprising:
    a lamp body having an opening, wherein an edge portion of the opening has a groove, a hole is provided on a wall of the groove, and the groove is injected with a gasket possessing a predetermined elasticity;
    a first reflector disposed within the lamp body;
    a second reflector having a locking portion; and
    a lens joined to the second reflector by welding, wherein the locking portion of the second reflector is hermetically engaged with the hole via a foamed gasket.

6. The vehicular lamp according to claim 5, wherein a leg portion is configured on a back surface of the second reflector, and the locking portion is provided on the leg portion.

7. The vehicular lamp according to claim 5, wherein the second reflector comprises an outer frame portion that extends beyond the opening of the lamp body.

8. A method of manufacturing a vehicular lamp, comprising:
    disposing a first reflector within a lamp body having an opening;
    welding an edge of a lens to an outer edge of a second reflector by laser welding in a manner of transmitting a laser beam through the lens from outside, wherein the second reflector has a leg portion in a back surface thereof;
    injecting seal material into a groove provided at an edge of the opening of the lamp body, wherein the seal material possesses a predetermined adhesibility; and
    inserting the leg portion of the second reflector into the groove.

* * * * *